(12) United States Patent
Mazej et al.

(10) Patent No.: US 7,472,646 B2
(45) Date of Patent: Jan. 6, 2009

(54) DOMESTIC APPLIANCE COMPRISING DETENT ELEMENTS AND DETENT COUNTER-ELEMENTS

(75) Inventors: Stanislav Mazej, Gomilsko (SI); Darko Ogrizek, Velenje (SI); Aleksander Sedovsek, Mozirje (SI); Uros Semeja, Smartno ob Paki (SI); Igor Zibret, Smartno ob Paki (SI)

(73) Assignee: BSH Bosch und Siemens Hausgeraete GmbH, Munich (DE)

( * ) Notice: Subject to any disclaimer, the term of this patent is extended or adjusted under 35 U.S.C. 154(b) by 94 days.

(21) Appl. No.: 11/547,022

(22) PCT Filed: Mar. 30, 2005

(86) PCT No.: PCT/EP2005/051435

§ 371 (c)(1),
(2), (4) Date: Sep. 29, 2006

(87) PCT Pub. No.: WO2005/095806

PCT Pub. Date: Oct. 13, 2005

(65) Prior Publication Data

US 2007/0205610 A1     Sep. 6, 2007

(30) Foreign Application Priority Data

Mar. 31, 2004   (DE) ..................... 10 2004 015 915

(51) Int. Cl.
*A23N 1/00* (2006.01)

(52) U.S. Cl. .................... 99/492; 99/511; 241/37.5; 241/92

(58) Field of Classification Search ........... 99/484–487, 99/509–513, 348, 501–508, 489, 492, 495, 99/493; 210/360.1, 380.1; 241/37.5, 92, 241/36, 282.1; 366/195–199, 205, 341, 314.601; 494/36, 42, 56, 58
See application file for complete search history.

(56) References Cited

U.S. PATENT DOCUMENTS 4,479,737 A   10/1984   Bergh et al.

(Continued)

FOREIGN PATENT DOCUMENTS

DE   36 36 176   5/1988

(Continued)

OTHER PUBLICATIONS

International Search Report PCT/EP2005/051435.

*Primary Examiner*—Timothy F. Simone
(74) *Attorney, Agent, or Firm*—Russell W. Warnock; James E. Howard

(57) ABSTRACT

A domestic appliance comprising at least one housing part with a detent element and at least one second housing part with a detent counter-element. Said elements are designed to interconnect the housing parts and are associated with a locking element, which is used to secure the detent elements, when the locking element is in the locked position, from becoming detached from the detent counter-elements. The aim of the invention is to facilitate the assembly and disassembly of the detent device. To achieve this, the locking element comprises a first end that is supported on one of the housing parts and a second end that engages with the detent element in the locked position. The locking element can thus be pivoted back and forth in a simple manner between a release position and a locked position, facilitating a more rapid, simpler assembly and disassembly.

20 Claims, 3 Drawing Sheets

U.S. PATENT DOCUMENTS

| | | | |
|---|---|---|---|
| 6,604,455 B2 * | 8/2003 | Areh et al. | 99/510 |
| 6,681,687 B2 * | 1/2004 | Areh et al. | 99/511 |
| 6,860,196 B2 * | 3/2005 | Areh et al. | 99/502 |
| 6,945,162 B2 * | 9/2005 | Areh et al. | 99/506 |
| 6,971,306 B2 * | 12/2005 | Areh et al. | 99/501 |
| 2004/0165946 A1 | 8/2004 | Areh et al. | |

FOREIGN PATENT DOCUMENTS

DE      195 40 823      5/1997

* cited by examiner

DOMESTIC APPLIANCE COMPRISING DETENT ELEMENTS AND DETENT COUNTER-ELEMENTS

BACKGROUND OF THE INVENTION

The invention relates to a domestic device with at least a first housing section which has a latching means and at least a second housing section which has a counter-latching means, which latching and counter-latching means are provided for connecting the housing sections and which are assigned a locking element by means of which the latching means is protected from becoming detached from the counter-latching means in a locking position of the locking element.

DE 101 42 508 A1 discloses a latching device for fastening a first body which can be inserted in a second body, in which a first wall of the first body extends essentially at right angles to a second wall of the second body, with a latching projection which is arranged on an inside of the first wall enclosed by the second body, and which can be pushed into a latching opening by a force exerted by a connecting means connected to the first body.

However, the disadvantage of this latching device of prior art is that the assembly and disassembly of the latching device is expensive.

the object of the invention is to design a generic latching device that can be assembled and disassembled more easily.

BRIEF SUMMARY OF THE INVENTION

This object is achieved according to the invention in that the locking element has a first end supported on one of the housing sections and a second end interlocking on the latching means in the locking position. Because of this the locking element can be easily detached, thus enabling the housing sections to be assembled and disassembled more quickly and more easily.

In a preferred embodiment of the invention the locking element is fastening to the housing section in such a manner that it can be moved, preferably pivotably, from a release position to the locking position. The locking element may therefore be pivoted to and fro quickly and easily between a release position and a locking position.

The locking element, when in the release position, should preferably assume a stress-free position. This means that the locking element bears against the latching means under stress in the swivelled position, i.e. in the locking position, which exerts an additional retaining force on the latching means.

In the locking position the second end of the locking element is able to engage in a latching groove or a latching projection on the latching means. For example, the latching groove or latching project can here be provided on the latching means opposite the counter-latching means. The latching projection may, for example, be designed in the shape of a roof overlapping the upper end of a locking element designed as a spring tab. The upper end of the locking element is therefore encompassed from above and partially from the left and right. A counterpart for the locking element designed as a latching groove may, for example, also be a notch in a side wall of the latching means in which the upper end of the locking means is clamped.

The locking element is preferably designed as a spring tab formed on the housing section, which tab can be bent from a load-relieved release position running essentially parallel to the latching means to an elastically clamped locking position.

The latching means may be designed as a spring-loaded latching hook formed on the first housing section, which hook engages in the counter-latching means on the second housing section designed as a latching cutout or latching projection.

Conversely, the latching means may also be designed as a latching cutout or latching projection formed on the first housing section in which a counter-latching means of the second housing section designed as a spring-loaded latching hook.

For a simplified locking of the latching-counter-latching means connection a first wall opening is provided on the housing section supporting the locking element, which opening is arranged on a side of the locking element facing away from the latching means, and through which a tool may be inserted for pivoting the locking element into the locking position. A tool, for example a slotted screwdriver, may be inserted through this first wall opening. By pivoting the slotted screwdriver, or by pivoting its blade, the locking movement is pivoted from its release position in the direction of the latching means, and the second end of the locking element is pushed into the latching projection of the latching means until the locking element is fixed in its locking position. Thus a latching-counter-latching means connection provided, in particular concealed, in the housing of the domestic appliance, can be detached or locked with simple tools. When the locking element is formed on the first housing section, an additional advantage consists in the fact that no additional separate locking elements are provided. This simplifies assembly because no separate locking elements have to be handled. Because of the reduced variety of parts manufacture is also generally less expensive. A further advantage consists in the fact that the locking elements are fixedly connected to the first housing section.

For simplified release of the latching means—counter-latching means connection a second wall opening is provided on the housing section supporting the locking element, which opening is arranged to run between the latching means and the locking element and through which a tool may be inserted for pivoting the locking element into the release position. The second wall opening is arranged between the latching means and the locking element. A tool, for example a slotted screwdriver, may be inserted through this wall opening. By pivoting the slotted screwdriver, or by pivoting its blade anticlockwise to the left, the locking element is pivoted from its locking position away from the latching means and the second end of the locking element is driven out of the latching projection of the latching means until the locking element is in its release position. The locking element can be pivoted from the locking position into the release position by taking this measure.

For simplified unlatching of the latching means-counter-latching means connection on the housing section supporting the latching means a third wall opening is provided which is arranged to run on a side of the latching means facing away from the locking element, through which opening a tool may be inserted for releasing the latching means from the counter-latching means. The third wall opening is arranged on a side of the latching means facing away from the locking element. A tool, for example a slotted screwdriver, may be inserted through this wall opening. By pivoting the slotted screwdriver, or by pivoting its blade anticlockwise to the left, the latching means is pivoted out of its position interlocking with the counter-latching means away from the counter-latching means, and is detached from it so that the first housing section is separated from the second housing section. This ensures destruction-free disassembly of the housing sections.

the generally described latching means-counter-latching means connection for domestic appliances is used in particular in electric motor driven juice extractors or in juicers.

A preferred exemplary embodiment of the invention is explained in more detail hereafter with reference to FIGS. 1 to 5.

DETAILED DESCRIPTION OF THE INVENTION

Figure 1:
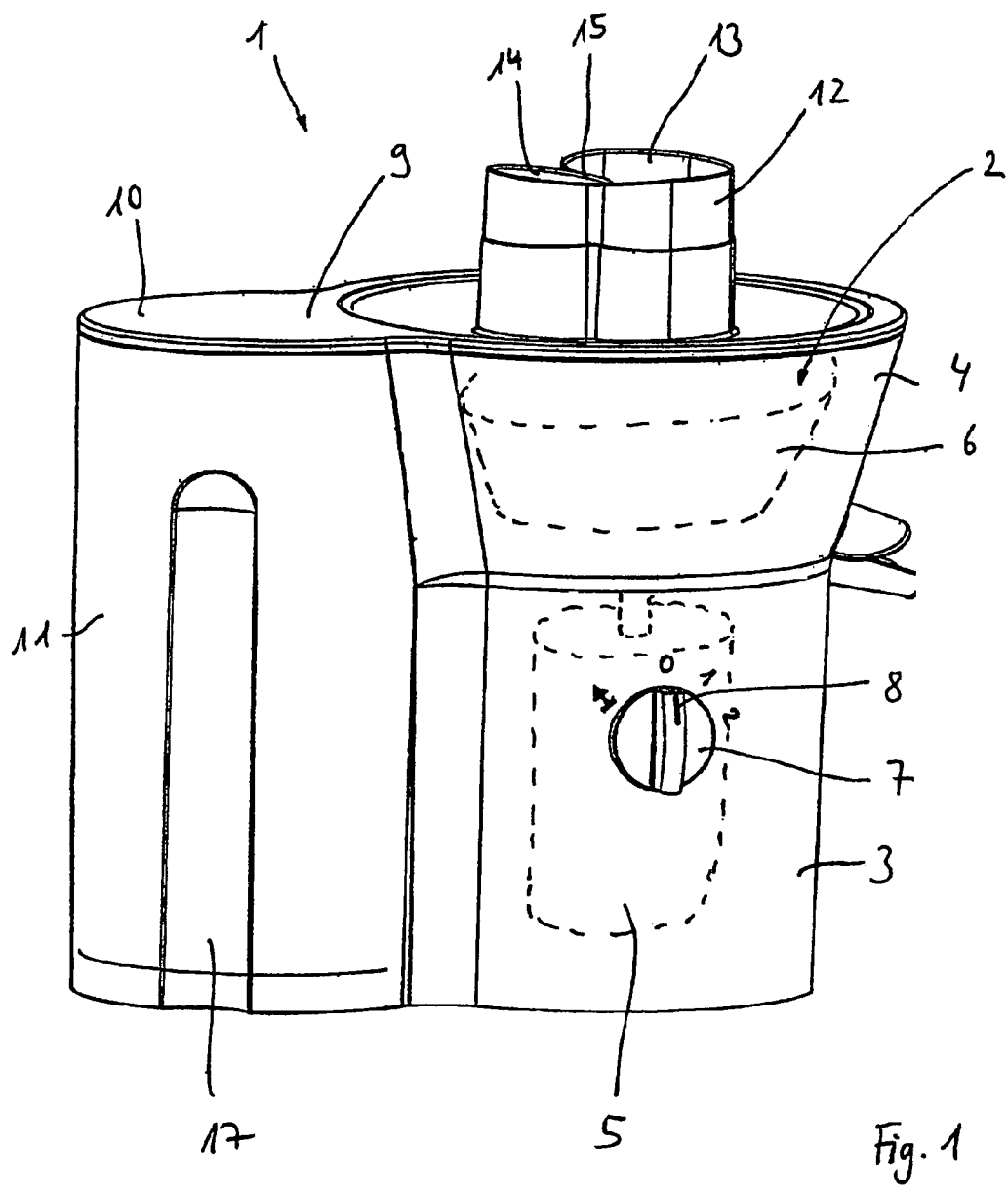
FIG. 1 shows a perspective view of a juicer which has housing interlocks according to the invention.

A juicer 1 shown in FIG. 1 has a housing 2 which comprises an essentially hollow cylindrical lower section 3 and a conically shaped upper section 4.

A drive motor 5 arranged in lower section 3, for a working tool 6 mounted rotatably in upper section 4, are only shown diagrammatically and in a concealed manner. The electrically operable drive motor 5 can be controlled by a rotatable actuating element 7. Actuating element 7 is designed as a rotary knob and is fitted on a front side wall of hollow cylindrical lower section 3. In the rotary position of actuating element 7 shown, a line marking 8 indicates switch position "0" in which the domestic appliance is put out of operation. In a switching position "I" of actuating element 7, located further to the right in the clockwise direction, juicer 1 is driven at a low speed, and in a switch position "II" of actuating element 7 located even further to the right, juice 1 is driven at a high speed. In a switch position "A" located left of switch position "0" in the clockwise direction, actuating element 7 is located in a release position 18 in which an appliance cover 9 may be released from its interlocking position so that when appliance cover 9 is removed, working tool 6 can also be removed. Appliance cover 9 bears flush against an upper side of housing 2 and also covers an upper opening 10 of a grape receptacle 11. Appliance cover 9 supports a filling shaft 12 through which pieces of food can be introduced into housing 2 onto working tool 6. Filling shaft 12 is designed in two sections, i.e. there are two fillers 13 and 14 which have different opening cross-sections and which are separated from each other by a shaft wall 15. Fillers 13 and 14 have an essentially circular to oval cross-section, the cross-section of filler 13 being designed larger than the cross-section of filler 14. The pieces of food introduced through filler 13 or 14 are separated by working tool 6 largely into fixed grape proportions and juice proportions. The grape proportions are collected in the grape receptacle 11 after separation and the juice proportions are fed further into a collection receptacle 16. Grape receptacle 11 has channel-shaped gripping regions 17 which spring inwardly back on two opposing receptacle walls.

Figure 2:
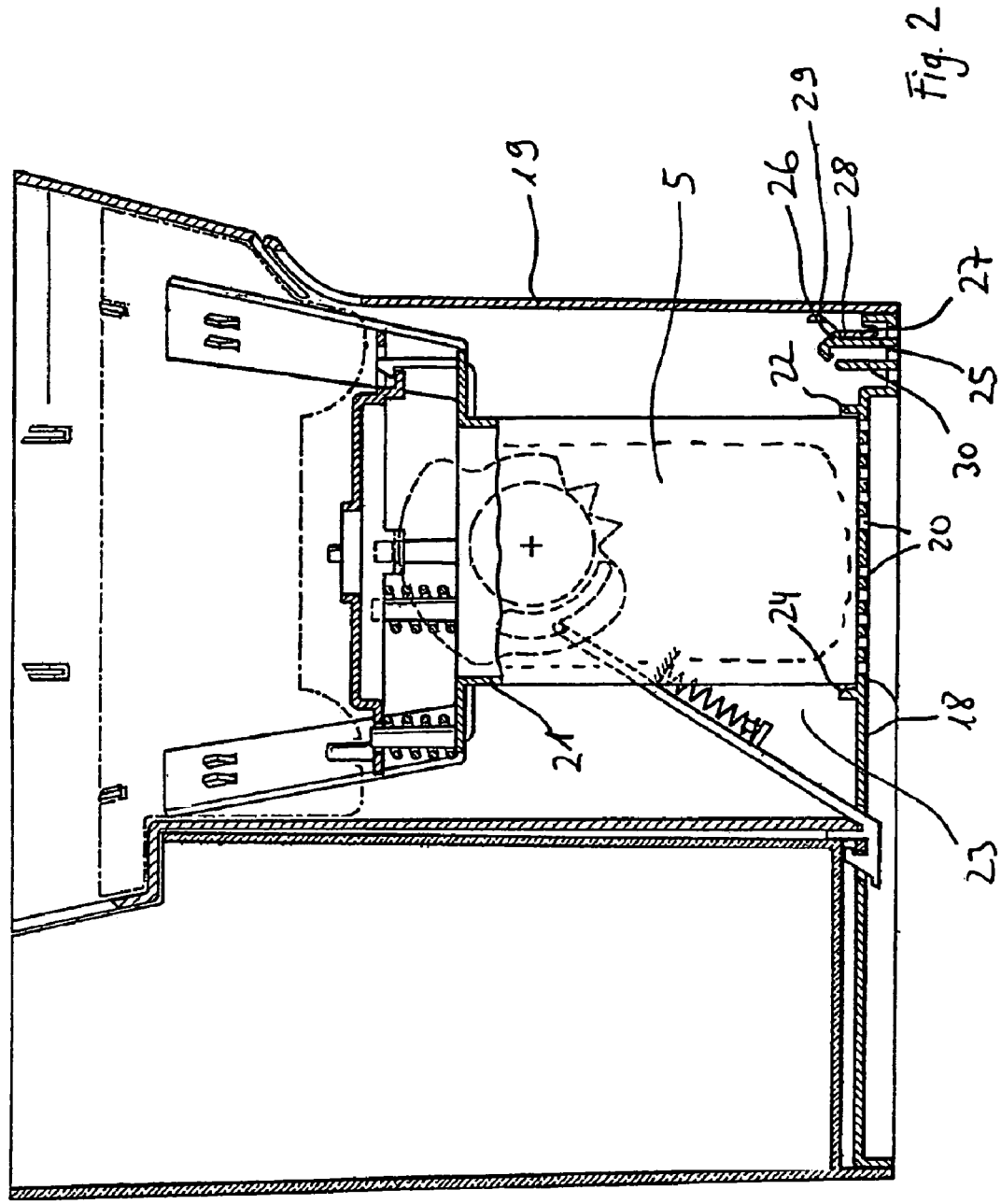
FIG. 2 shows a sectional view of the juicer of FIG. 1 with a housing interlock according to the invention.

Housing 2 shown in FIG. 2 in a sectional view has a first housing section 18 and a second housing section 19. First housing section 18 forms a bottom of juicer 1, which is provided with air vents 20 for cooling motor 5. Motor 5 is retained in a motor housing 21 which is retained in a seat 22 formed on first housing section 18. Seat 22 extends as an annular projection from the inside of first housing section 18 into a receiving space 23 for motor housing 21 of motor 5. To ensure that motor housing 21 can be inserted in a self-centering manner in annular seat 22, the upper edge of seat 22 has a bevel 24. First housing section 18 designed as a base plate supports a latching means 25. Latching means 25 is designed as a strap formed on first housing section 18, which strap supports a spring-loaded latching hook 26. In its locked position latching hook 26 of latching means 25 engages behind a counter-latching means 27 on second housing section 19. Counter-latching means 27 is designed as latching projection 28. A latching cutout 29, in which latching projection 28 of second housing section 19 engages, is formed on first housing section 18 for an additional stable connection of first housing section 18 and second housing section 19. First housing section 18 and second housing section 19 are connected at a plurality of points via a number of latching means 25 and counter-latching means 27. These connection points are preferably arranged so that they are distributed at least approximately uniformly around the periphery of housing 2.

Figure 3:
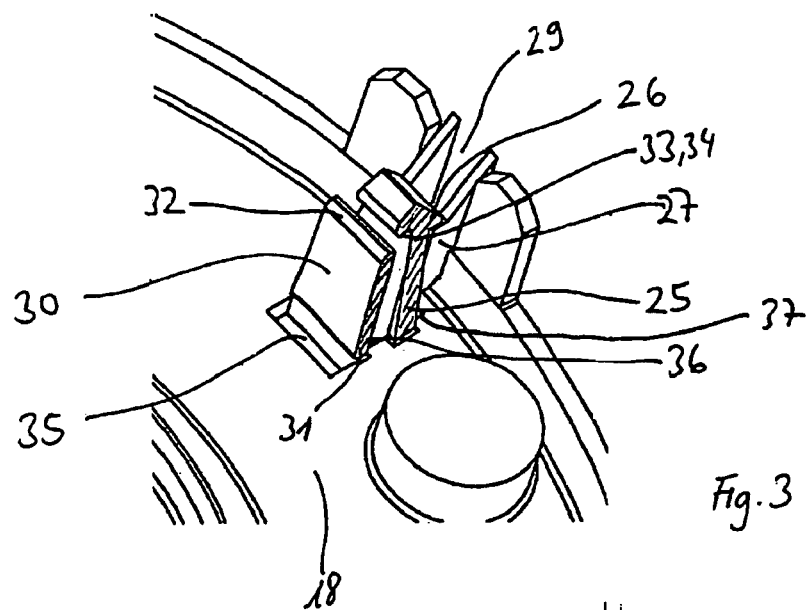
FIG. 3 shows a perspective partial view of a housing interlock according to the invention.
Figure 4:
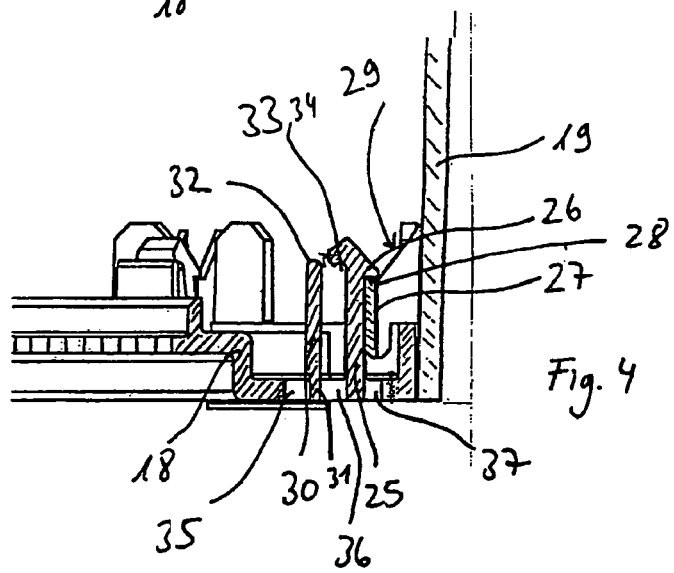
FIG. 4 shows a sectional view of the housing interlock according to FIG. 3 with a locking element in the release position.
Figure 5:
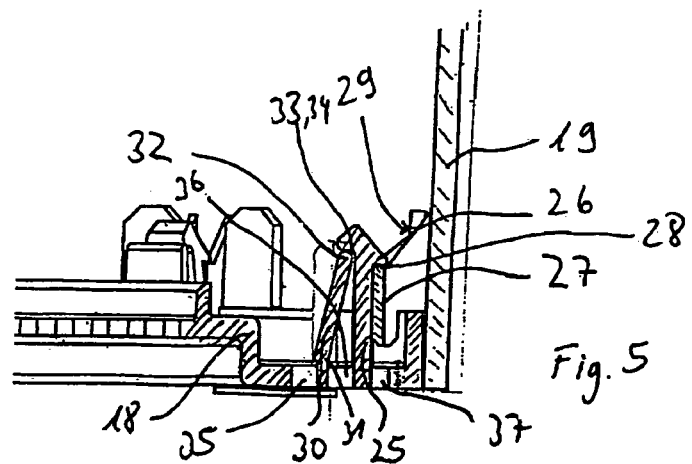
FIG. 5 shows a sectional view of the housing interlock according to FIG. 3 with a locking element in the locking position.

The function of a locking element 30 according to the invention is shown in FIGS. 3 to 5. FIG. 3 shows in a perspective view, and FIG. 4 in a sectional view, a latching means 25 and counter-latching means 27 connection in a release position of locking element 30. Locking element 30 is designed as a strap. A first end 31 of locking element 30 is formed on first housing section 18. A second free end 32 of locking element 30 projects vertically upwards and runs essentially parallel to latching means 25 in the release position shown in FIG. 3, without engaging in a latching groove 33 which is formed at the upper end of latching means 25 opposite latching hook 26. Latching groove 3 may also be designed as a suitably shaped latching projection 34, adapted to the shape of second free end 32 of locking element 30.

FIG. 5 shows in a sectional view the latching means 25 and counter-latching means 27 connection in a locking position of locking element 30. First end 31 of locking element 30 is formed on first housing section 18 so that it is bent into a position pivoted to the right in the clockwise direction shown in FIG. 5 from a position running essentially parallel to latching means 25. In this position pivoted to the right second end 32 of locking element 30 engages in latching projection 34 of latching means 25, thereby fixing latching means 25 in its position. Undesirable pivoting of latching means 25 into a position pivoted in FIG. 5 to the left in the anticlockwise direction is no longer possible, thereby reliably preventing latching hook 26 of latching means 25 from slipping from latching projection 28 of counter-latching means 27.

First housing section 18, which supports locking element 30, has a first wall opening 35. First wall opening 35 is arranged on a side of locking element 30 facing away from latching means 25. A tool, for example a slotted screwdriver, may be inserted through this wall opening 35. By pivoting the slotted screwdriver, or by pivoting its blade (not shown), to the right in the clockwise direction shown in FIG. 4, locking element 30 is pivoted from its release position (FIGS. 3 and 4) in the direction of latching means 25, and second end 32 of locking element 30 is pressed into latching projection 34 of latching means 25 until locking element 30 is fixed in its locking position (FIG. 5).

First housing section 18, which supports locking element 30, has a second wall opening 36. Second wall opening 36 is arranged between latching means 25 and locking element 30. A tool, for example a slotted screwdriver, can be inserted through this wall opening 36. By pivoting the slotted screwdriver, or pivoting its blade (not shown) to the left in the anticlockwise direction shown in FIG. 5, locking element 30 is pivoted out of its locking position (FIG. 5) away from latching means 25, and second end 32 of locking element 30 is driven out of latching projection 34 of latching means 25 until locking element 30 is in its release position (FIGS. 3 and 4). Locking element 30 can be pivoted from the locking position into the release position by taking this measure.

First housing section 18, which supports locking element 30, has a third wall opening 37. Third wall opening 37 is arranged on a side of latching means 25 facing away from locking element 30. A tool, for example a slotted screwdriver, can be inserted through this wall opening 37. By pivoting the slotted screwdriver, or by pivoting its blade (not shown) to the left in the anticlockwise direction in FIG. 4 or 5, latching means 25 is pivoted out of its position locked with counter-latching means 27 (FIGS. 4 and 5) away from counter-latching means 27, and is released from it so that first housing section 18 is separated from second housing section 19. A destruction-free assembly of housing sections 18 and 19 is therefore possible.

The invention claimed is:

1. A domestic appliance comprising:
    a first housing section having a latching means;
    a second housing section having a counter-latching means, the counter-latching means engaging with the latching means in a housing assembled condition in which the first housing section and the second housing section are assembled together with one another such that the latching means and the counter-latching means resist a movement of the first housing section and the second housing section to disconnect from one another, and the latching and counter-latching means connecting the first and second housing sections to one another;
    a locking element resisting the latching means from becoming detached from the counter-latching means in a locking position of the locking element; and
    the locking element having a first end supported on one of the housing sections and a second end engaging the latching means in the locking position.

2. The domestic appliance according to claim 1, wherein the locking element is fastened to the first housing section and is movable between the locking position, in which the second end engages the latching means, and a release position, in which the second is disengaged from the latching means, the locking element assumes a stress-free position in the release position, the locking element, in the locking position, is held on the latching means in an elastically pre-stressed manner, and the second end of the locking element in the locking position engages in at least one of a latching groove and a latching projection on the latching means.

3. The domestic appliance according to claim 1, wherein the locking element includes a spring tab formed on the housing section which can be bent from a stress-relieved release position running essentially parallel to the latching means to an elastically clamped locking position.

4. The domestic appliance according to claim 1, wherein the latching means is designed as a spring-loaded latching hook formed on the first housing section, which hook engages in the counter-latching means on the second housing section designed as a latching cutout or latching projection.

5. The domestic appliance according to claim 1, wherein the latching means includes at least one of a latching cutout and a latching projection formed on the first housing section, the counter-latching means of the second housing section including a spring-loaded latching hook engaging the latching means.

6. The domestic appliance according to claim 3, wherein a housing section supporting the locking element has a first wall opening which is arranged to run on the side of the locking element facing away from the latching means and through which a tool may be inserted for pivoting the locking element into the locking position.

7. The domestic appliance according to claim 3, wherein a housing section supporting the locking element has a second wall opening which is arranged to run between the latching means and the locking element for receiving an opening tool for moving the locking element into the release position.

8. The domestic appliance according to claim 3, wherein a housing section supporting the latching means has a third wall opening which is arranged to run on a side of the latching means facing away from the locking element, through which opening a tool may be inserted for releasing the latching means from the counter-latching means.

9. The domestic appliance according to claim 1, wherein the domestic appliance includes an electric motor driven juice extractor.

10. A domestic appliance comprising:
    a first housing section having a latching means;
    a second housing section having a counter-latching means, the latching means and the counter-latching means being engageable with one another in a housing assembled condition in which the first housing section and the second housing section are assembled together with one another, the latching means and the counter-latching means, when in engagement with one another, resisting a movement of the first housing section and the second housing section to disconnect from one another, and the latching means being disposable between a cinch position in which the latching means engages the counter-latching means in a manner such that the latching means and the counter-latching means resist a movement of the first housing section and the second housing section to disconnect from one another, and an uncinched position in which the latching means is no longer in an engagement with the counter-latching means so as to resist the respective movement of the first housing section and the second housing section to disconnect from one another; and
    a locking element, the locking element having a first end supported on one of the housing sections and a second end engaging the latching means, the locking element being disposable between a prevent position in which the locking element engages the latching means to resist a movement of the latching means from its cinched position to its uncinched position and a release position in which the locking element does not resist a movement of the latching means from its cinched position to its uncinched position to the same degree as such a movement is resisted in the prevent position of the locking element.

11. The domestic appliance according to claim 10, wherein the latching means has a bias that biases the latching means into its cinched position.

12. The domestic appliance according to claim 10, wherein the locking means has a bias that biases the locking means into its release position and, when the locking element, in its prevent position, engages the latching means to resist a movement of the latching means from its cinched position to its uncinched position, the locking means resists the urging of the bias of the locking means to return the locking means to its release position.

13. The domestic appliance according to claim 10, wherein the latching means has a bias that biases the latching means into its cinched position, the locking means has a bias that biases the locking means into its release position, and, when the locking element, in its prevent position, engages the latching means to resist a movement of the latching means from its cinched position to its uncinched position, the locking means resists the urging of the bias of the locking means to return the locking means to its release position.

14. The domestic appliance according to claim 13, wherein the second end of the locking element in the locking position engages in at least one of a latching groove and a latching projection on the latching means.

15. The domestic appliance according to claim 10, wherein the locking element includes a spring tab formed on the housing section which can be bent from a stress-relieved release position running essentially parallel to the latching means to an elastically clamped locking position.

16. The domestic appliance according to claim 14, wherein the latching means is designed as a spring-loaded latching hook formed on the first housing section, the hook of the latching means engaging in the counter-latching means on the second housing section designed as a latching cutout or latching projection.

17. The domestic appliance according to claim 10, wherein the latching means includes at least one of a latching cutout and a latching projection formed on the first housing section and the counter-latching means of the second housing section includes a spring-loaded latching hook engaging the latching means.

18. The domestic appliance according to claim 10, wherein the respective housing section supporting the locking element has a first wall opening which is arranged to run on the side of the locking element facing away from the latching means and through which a tool may be inserted for pivoting the locking element into the locking position.

19. The domestic appliance according to claim 10, wherein the respective housing section supporting the locking element has a second wall opening which is arranged to run between the latching means and the locking element for receiving an opening tool for moving the locking element into the release position.

20. The domestic appliance according to claim 10, wherein the domestic appliance includes an electric motor driven juice extractor.

* * * * *